United States Patent [19]

Taylor

[11] Patent Number: 5,269,816
[45] Date of Patent: Dec. 14, 1993

[54] PROCESS FOR COLORING TEXTILE MATERIALS

[75] Inventor: John A. Taylor, Manchester, England

[73] Assignee: Imperial Chemical Industries PLC, London, England

[21] Appl. No.: 861,393

[22] Filed: Mar. 31, 1992

Related U.S. Application Data

[62] Division of Ser. No. 444,433, Dec. 1, 1989, Pat. No. 5,149,790.

[30] Foreign Application Priority Data

Dec. 2, 1988 [GB] United Kingdom ................ 8828222

[51] Int. Cl.$^5$ ........................ C09B 62/04; D06P 1/382
[52] U.S. Cl. ........................................... 8/549; 8/543; 8/918
[58] Field of Search .............. 534/618, 623, 624, 634; 544/75, 189; 8/549

[56] References Cited

U.S. PATENT DOCUMENTS

| 3,647,778 | 3/1972 | Andrew et al. | 534/634 |
| 4,584,367 | 4/1986 | Matsuo et al. | 534/634 |

FOREIGN PATENT DOCUMENTS

| 42204 | 12/1981 | European Pat. Off. | 534/634 |
| 148785 | 6/1981 | Fed. Rep. of Germany | 534/634 |
| 1228184 | 4/1960 | France | 534/634 |
| 1017271 | 1/1966 | United Kingdom | 534/634 |
| 1389053 | 4/1975 | United Kingdom | 534/618 |

OTHER PUBLICATIONS

Allen, R. L. M. Colour Chemistry (Nelson: Great Britain, 1971), p. 203.

Primary Examiner—Mary C. Lee
Assistant Examiner—Fiona T. Powers
Attorney, Agent, or Firm—Cushman, Darby & Cushman

[57] ABSTRACT

A process for coloring textile materials which includes applying thereto a water-soluble reactive dye containing a chlorotriazine group and a diaminobenzylamine linker group.

16 Claims, No Drawings

PROCESS FOR COLORING TEXTILE MATERIALS

This is a division of application Ser. No. 07/444,433, filed Dec. 1, 1989, now U.S. Pat. No. 5,149,79.

This invention relates to reactive dyes, to their preparation and to their application to textile substrates.

According to the invention, there are provided water-soluble reactive dyes of the formula:

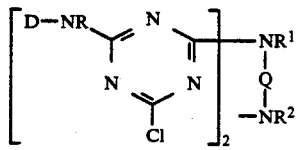
(1)

wherein D represents the radical of a water-soluble chromophoric compound; each of R, $R^1$ and $R^2$, independently, represents hydrogen or an optionally substituted alkyl radical and Q represents a radical of the formula:

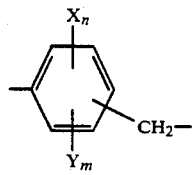
(2)

wherein each of X and Y, independently, represents halogen, alkyl, alkoxy, acylamino, nitro, carboxy or sulpho and each of n and m, independently, represents an integer from 0 to 2.

The radical represented by D may be for example a radical of the azo, for example monoazo, disazo and metallised azo, anthraquinone, phthalocyanine, formazan or triphenodioxazine series, carrying one or more water-solubilising groups, for example sulphonic acid groups.

It is preferred that D is a sulphonated monoazo radical, for example a sulphonated azobenzene, azonaphthalene or phenylazonaphthalene radical in which the aromatic rings may carry, in addition to sulphonic acid groups, substituents appropriate to water-soluble reactive dyes.

As examples of valuable sulphonated monoazo radicals which may be represented by D, there may be mentioned radicals of the formula:

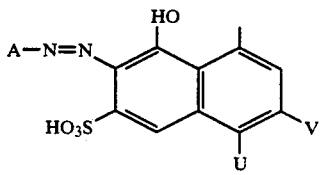
(3)

wherein one of U and V is $SO_3H$ and the other is H, and

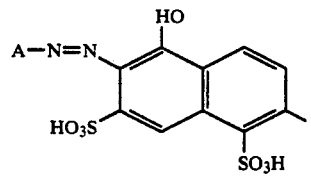
(4)

A being a radical of the benzene or naphthalene series.

Particularly useful dyes contain sulphonated monoazo radicals of Formula 3 or Formula 4 wherein A is a sulphonated phenyl or naphthyl radical, especially a radical containing a sulpho group in an ortho position relative to the azo link. Thus, valuable structures represented by A include:

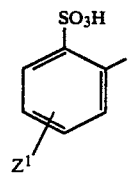
(5)

wherein $Z^1$ represents H, $SO_3H$, $C_{1-4}$-alkyl (especially methyl) or $C_{1-4}$-alkoxy (especially methoxy), and

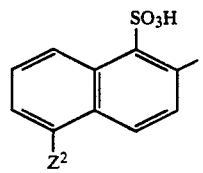
(6)

wherein $Z^2$ represents H or $SO_3H$.

As examples of other valuables sulphonated monoazo radicals which may be represented by D, thereby may be mentioned radicals of the formula:

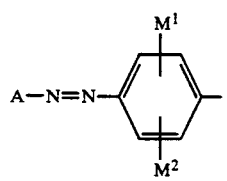
(7)

wherein A is a sulphonated phenyl or naphthyl radical as above, $M^1$ represents hydrogen, $C_{1-4}$-alkyl or $C_{1-4}$-alkoxy and $M^2$ represents hydrogen, $C_{1-4}$-alkyl, $C_{1-4}$-alkoxy or —NHCOT wherein T denotes $C_{1-4}$-alkyl or —$NH_2$.

Particularly useful radicals within the scope of Formula 7 include:

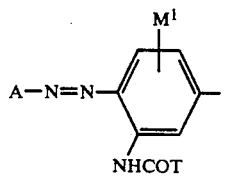
(8)

especially those in which A is a sulphonated naphthyl radical, $M^1$ is hydrogen or $C_{1-4}$-alkoxy, for example methyl, and T is preferably methyl or amino.

Optionally substituted alkyl radicals which may be represented by R, $R^1$ and $R^2$ include $C_{1-8}$-, preferably $C_{1-4}$-, alkyl radicals which may carry substituents selected from halogen, hydroxy, cyano, carboxy, carbamoyl, alkoxy, acyl, acyloxy, alkoxycarbonyl and optionally substituted phenyl.

The dyes of the invention may be prepared by reacting one mole of an o-, m- or p-aminobenzylamine of the formula:

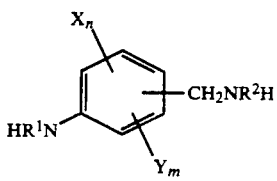 (9)

wherein $R^1$, $R^2$, X, Y, n and m are as defined above with two moles of a triazine compound of the formula:

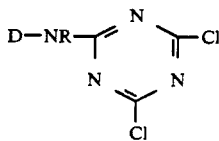 (10)

wherein D and R are as defined above.

The above process can conveniently be carried out by stirring the reactants in an aqueous medium, optionally in the presence of a water-soluble organic solvent, at a temperature of from 20 to 60° C., and preferably maintaining the pH at from 5 to 9 by adding an acid-binding agent to neutralise the hydrogen halide formed during the reaction. Suitable acid-binding agents are alkali metal hydroxides, carbonates and bicarbonates.

As examples of diamines of Formula 9 there may be mentioned the three isomeric aminobenzylamines and derivatives in which one or both nitrogen atoms carry $C_{1-4}$-alkyl radicals.

Compounds of Formula 10 may be obtained, for example, by reacting cyanuric chloride at 0-20° C. in aqueous medium, with water soluble dyestuff compounds of the formulae DNRH wherein D and R are as defined above. Such dyestuff compounds have been fully described in the prior art and especially include monoazo dyes obtained from diazo components such as
aniline-2-sulphonic acid,
2-naphthylamine-1,5-disulphonic acid,
aniline,
aniline-3-sulphonic acid,
aniline-4-sulphonic acid,
aniline-2,4-disulphonic acid,
aniline-2,5-disulphonic acid,
aniline-3,5-disulphonic acid,
2-methyl-4-sulphoaniline,
2-methyl-5-sulphoaniline,
2-sulpho-4-methylaniline,
2-sulpho-5-methylaniline,
2-methoxy-5-sulphoaniline,
2-sulpho-4-methoxyaniline,
2-chloro-4-sulphoaniline,
2,5-dichloro-4-sulphoaniline,
2-chloro-5-sulphoaniline,
2-sulpho-4-nitroaniline,
2-sulpho-5-nitroaniline,
2-carboxy-5-sulphoaniline,
2-aminonaphthalene-1-sulphonic acid,
2-aminonaphthalene-1,5,7-trisulphonic acid,
2-aminonaphthalene-3,6,8-trisulphonic acid,
2-aminonaphthalene-4,8-disulphonic acid,
2-aminonaphthalene-5,7-disulphonic acid,
2-aminonaphthalene-6-sulphonic acid,
1-aminonaphthalene-4-sulphonic acid,
1-aminonaphthalene-5-sulphonic acid,
1-aminonaphthalene-6-sulphonic acid,
1-aminonaphthalene-7-sulphonic acid,
1-aminonaphthalene-4,8-disulphonic acid,
1-aminonaphthalene-3,8-disulphonic acid,
1-aminonaphthalene-2,5,7-trisulphonic acid, and
1-aminonaphthalene-3,5,7-trisulphonic acid.

The above-mentioned diazo components may be combined with coupling components containing amino groups, the resulting dyes then being reacted with cyanuric chloride, reaction taking place at the said amino groups.

Suitable amino group containing coupling components include aniline,
o-toluidine,
m-toluidine,
o-anisidine,
m-anisidine,
2,6-xylidine,
cresidine,
2,6-dimethoxyaniline,
m-aminoacetanilide,
m-ureidoaniline,
3-amino-4-methoxyacetanilide,
1-hydroxy-8-aminonaphthalene-3,6-disulphonic acid,
1-hydroxy-8-aminonaphthalene-3,5-disulphonic acid,
1-hydroxy-6-aminonaphthalene-3-sulphonic acid,
1-hydroxy-6-methylaminonaphthalene-3-sulphonic acid,
1-hydroxy-7-aminonaphthalene-3-sulphonic acid,
1-hydroxy-7-methylaminonaphthalene-3-sulphonic acid, and
1-hydroxy-6-aminonaphthalene-3,5-disulphonic acid.

Alternatively, the triazine group may be attached to the diazo component of the dye. Suitable diazo components for this purpose include 1,3-diaminobenzene-4-sulphonic acid,
1,3-diaminobenzene-4,6-disulphonic acid,
1,4-diaminobenzene-3-sulphonic acid,
3,7-diaminonaphthalene-1,5-disulphonic acid,
N-methyl-p-phenylene diamine,
N-ethyl-m-phenylene diamine,
m-phenylene diamine and
4,4'-diaminostilbene-2,2'-disulphonic acid
which may be combined with coupling components such as
1-p-sulphophenyl-3-carboxypyrazol-5-one or
1-ethyl-2-hydroxy-3-carbonamido-4-methylpyrid-6-one.

Dyes of the invention may also be prepared by reacting a diamine of Formula 9 with two moles of cyanuric chloride followed by the dyestuff compound DNRH.

The reactions leading to the formation of the dyes of the invention may be performed using conditions that have been fully described in the prior art for such reactions. Similarly, the dyes may be isolated by known methods, for example spray drying or precipitation and filtration. As in the case of other dyes containing sulphonic acid groups, it is often convenient to isolate and use the dyes in the form of their water-soluble salts, particularly their alkali metal (especially sodium or ammonium salts. It is to be understood that the invention relates to both the free acids and their salts.

The dyes of the present invention may be used for colouring a wide range of textile materials containing hydroxyl or amino groups, for example wool, silk, synthetic polyamides and natural or regenerated cellulose, for example cotton or viscose rayon materials, by conventional methods used for colouring such materials with water-soluble reactive dyes. Thus, in the case of cellulose they are preferably applied in conjunction with a treatment with an acid binding agent such as caustic soda, sodium carbonate, phosphate, silicate or bicarbonate, which may be applied to the cellulose textile materials before, during or after the application of the dyestuff.

The dyes of the present invention are valuable reactive dyes for cellulose. They yield coloured textiles in various shades with good resistance to washing and light. They are particularly characterised by having superior wash-off properties relative to the% corresponding known dyes containing a phenylene diamine residue instead of an aminobenzylamine residue.

The invention is further illustrated by the following examples in which all parts and percentages are by weight unless otherwise indicated. The expression "M.I." indicates the weight in grams of dye or intermediate containing one gram-mole of pure product.

EXAMPLE 1

A solution of 1-hydroxy-2-(2'-sulphophenylazo)-8-(4",6"-dichloro-s-triazin-2"-ylamino)-naphthalene-3,6-disulphonic acid (27.6 g, M.I. 1380, 0.02 mole) and N-methyl-m-aminobenzylamine (1.36 g, 0.1 mole) was stirred at 20 to 25° C. and pH 6 for 0.5 hours followed by 3 hours at 30 to 35° C. and pH 8.5. On cooling, the pH was adjusted to 7.0 with 2N hydrochloric acid, a small amount of insoluble matter was filtered off and salt (22% w/v) was added, with stirring. The precipitated product was collected, washed with brine (20%) and dried. Yield 18.0 g, M.I. 2000.

The product dyed cotton a bright yellowish red shade with good build up and wash off.

EXAMPLE 2

A solution of 1-hydroxy-2-(2'-sulpho-4'-methylphenylazo)-6-(2",4"-dichloro-s-triazin-6"-ylamino)-naphthalene-3,5-disulphonic acid (12.8 g, M.I. 1021, 0.0125 mole) and N-methyl-m-aminobenzylamine (0.85 g 0.00625 mole) was stirred at 20° C. and pH 6.5. After 30 minutes, the pH was adjusted to 8.5 and the temperature raised to 35° C. Further dichlorotriazinyl dye (0.7 g) was added to balance the reaction, the mixture was allowed to cool to 20° C., the pH was adjusted to 7.0 and product was precipitated by the addition of sodium chloride (15% w/v) and potassium chloride (5% w/v). Yield 12.6 g, M.I. 2445.

The product dyed cotton a bright orange shade with good build up and wash off.

EXAMPLE 3

A solution of 1-hydroxy-2-(1',5'-disulphonaphth-2'-ylazo)-6-(4",6"-dichloro-s-triazinylamino)-naphthalene-3,5-disulphonic acid (22.6 g, M.I. 1355, 0.0167 mole) and o-aminobenzylamine (1.016 g, 0.0083 mole) was stirred at pH 8 and 35° C. for 2 hours. Further o-aminobenzylamine (0.2 g) was added and heating continued for a further 2 hours. On cooling to 20° C., salt (25% w/v) was added and the mixture was stirred for 16 hours. Precipitated solid was collected and dried.
Yield 31.0g, M.I. 3728.

The product was a bright orange which built up well and washed off easily.

EXAMPLE 4

A solution of 3-ureido-4-(3',6',8'-trisulphonaphth-2'-yl-azo)-N-(4",6"-dichloro-s-triazin-2'"-yl)aniline (27.8 g, M.I. 1388, 0.02 m) and N-methyl-m-aminobenzylamine (1.36 g, 0.01 m) was reacted as in Example 3. Further dichlorotriazine (0.5 g) was required to balance the reaction. After completion, the pH was adjusted to 7.5, the solution was filtered to remove any insoluble material and water was partially removed under reduced pressure to leave a solution, volume 150 ml. Ethanol (300 ml) was added slowly, with stirring, the precipitated product was washed and dried.
Yield 18.5 g, M.I. 2280.

The product dyed cotton a deep reddish yellow shade with good wash off properties.

EXAMPLE 5

A solution of 1-hydroxy-2-(1',5'-disulphonaphth-2'-ylazo)-6-(4",6"-dichloro-s-triazin-2"-ylamino)-naphthalene-3,5-disulphonic acid (135.25 g) and N-methyl-m-aminobenzylamine (5.66 g) was stirred at pH 8.5 to 9.0 and at 35° to 40° C. After 2.5 hours, all the linking diamine had been consumed and further small portions were added up to a total of 0.81 g over 4.5 hours after which the reaction appeared complete as judged by hplc. The mixture was allowed to cool to 20° C., the pH was adjusted to 7.0 with 2N hydrochloric acid, the solution was filtered to remove any traces of insoluble matter and salt (25% w/v) added with stirring. After 16 hours the precipitated orange product was collected and dried. Yield 113.49.

EXAMPLE 6

By the same general method 1-hydroxy-2-(2'-sulpho-4'-methylphenylazo)-6-(4",6"-dichloro-s-triazin-2"-ylamino)-naphthalene-3,5-disulphonic acid was condensed with a half equivalent of m-aminobenzylamine to give an orange dye.

Other dyes prepared by a similar procedure are listed in Table 1, the chlorotriazine group being attached to the coupling component.

TABLE 1

| Example | Diazo Component | Coupling Component | Linking Diamine | Shade |
|---|---|---|---|---|
| 7 | 2-Amino-naphthalene-1,5-disulpho | 1-Hydroxy-8-amino-naphthalene-3,6-disulpho | o-Amino-benzylamine | Bluish red |
| 8 | 2-amino-naphthalene-1-sulpho | 1-Hydroxy-8-amino-naphthalene-3,6-disulpho | m-amino-benzylamine | Bluish red |
| 9 | 2-amino-naphthalene-1,5-disulpho | 1-Hydroxy-8-amino-naphthalene-3,6-disulpho | N-beta-hydroxyethyl-m-amino-benzylamine | Bluish red |
| 10 | 2-amino-naphthalene-4,8-disulpho | 3-amino-4-methoxy-acetanilide | p-amino-benzylamine | Reddish yellow |

TABLE 1-continued

| Example | Diazo Component | Coupling Component | Linking Diamine | Shade |
|---|---|---|---|---|
| 11 | Aniline-2,5-disulpho | 1-Hydroxy-6-amino-naphthalene-3-sulpho | m-amino-benzylamine | Greenish orange |
| 12 | 2-amino-naphthalene-3,6,8-trisulpho | 2,6-xylidine | 2,4-disulpho-5-amino-N-methyl-benzyl-amine | Yellow |
| 13 | Aniline-2,5-disulpho | 2,6-dimethoxy-aniline | N-n-butyl-3-amino-benzylamine | Yellow |
| 14 | 2-sulpho-4-methyl-aniline | 2-methoxy-5-methylaniline | 4-amino-benzylamine | Yellow |
| 15 | Aniline-2,4-disulpho | 1-(2'-methyl-3'-amino-5'-sulpho-phenyl)-3-carboxy-pyrid-5-one | 3-amino-N-methyl-benzylamine | Greenish yellow |
| 16 | 2-amino-naphthalene-1,5-disulpho | 1-beta-amino-ethyl-2-hydroxy-3-carbonamido-4-methyl-pyrid-6-one | 3-amino-6-chloro-N-methyl-benzylamine | Greenish yellow |
| 17 | 2-amino-5-methoxy-benzene sulpho | 1-hydroxy-7-methylamino-naphthalene-3-sulpho | m-amino-benzylamine | Yellowish-red |
| 18 | 2-amino-benzene-1,5-disulpho | 1-hydroxy-7-amino naphthalene-3-sulpho | m-amino-benzylamine | Orange |
| 19 | 2-amino-naphthalene-1-sulpho | 1-hydroxy-8-amino-naphthalene-3,5-disulpho | m-amino-benzylamine | Bluish-red |

Dyes in which the reactive group is attached to the diazo component are listed in Table 2.

TABLE 2

| Example | Diazo Component | Coupling Component | Linking Diamine | Shade |
|---|---|---|---|---|
| 20 | 2,4-diamino-benzene-1,5 disulpho | 1-ethyl-2-hydroxy-3-carbonamido-4-methyl-pyrid-6-one | m-Amino-benzylamine | Greenish yellow |
| 21 | 2,4-diamino-benzene-1,5 disulpho | 1-(4'-sulpho-phenyl)-3-methylpyrazol-5-one | N-Ethyl-m-amino-benzylamine | Greenish yellow |
| 22 | 2,5-diamino-benzene-1,4-disulpho | 1-(4'-sulpho-phenyl)-3-carboxy-pyrazolone | N-isopropyl-m-amino-benzylamine | Reddish yellow |
| 23 | 2,5-diamino-benzene-1,4-disulpho | 1-(4'-sulpho-phenyl)-3-carboxy-pyrazolone | m-amino-benzylamine | Reddish yellow |
| 24 | 2,4-diamino-benzene sulpho | 1-Ethyl-2-hydroxy-3-cyano-4-methyl | m-amino-benzylamine | Greenish yellow |
| 25 | 2,4-diamino-benzene sulpho | 1-Hydroxy-6-acetylamino-naphthalene-3-sulpho | N-methyl-m-amino benzylamine | Orange |

EXAMPLE 26

1.066 g of m-aminobenzylamine dissolved in acetone (20 ml) was added to a stirred solution of 1-hydroxy-2-(1',5'-disulphonaphth-2'-yl-azo)-6-(4",6"-dichloro-s-triazin-2"-ylamino)-naphthalene-3,5-disulphonic acid (22.57g, M.I. 1355) in water (500 ml). The mixture was stirred at ph 6 to pH 7 at 20° C. for 30 minutes and then at pH 8.5 and 35° C. for 4.5 hours. The mixture was screened and salt (15% w/v) added to the filtrate. The resulting precipitated orange dye was collected, washed with brine (20% w/v) and dried.

Yield 13.1 g, M.I. 2480.

EXAMPLE 27

A solution of m-aminobenzylamine (0.59g) in acetone (10 ml) was; added to a stirred solution of 1-hydroxy-2-(1',5'-disulphonaphth-2'-yl-azo)-8-(4",6"-dichloro-s-triazin-2"-ylamino)-naphthalene-3,6-disulphonic acid (21.89 g, M.I. 2188) in water (200 ml). The reaction mixture was stirred at 20° C. and at pH 6 to 7 for 2 hours, then at 30° to 35° C. and pH 8.0 to 8.5 for 3 hours. After filtering to remove any traces of insoluble product, ethanol was added and the resulting precipitated bluish-red dye collected and dried.

Yield 14.6g, M.I. 2737.

When N-methyl-m-aminobenzylamine (0.68 g) was substituted for m-aminobenzylamine in the above reaction and the desired product collected as above, the yield of bluish-red product was 14.1 g M.I. 2619.

EXAMPLE 28

A solution of N-methyl-m-aminobenzylamine (1.36 g) in acetone (20 ml) was added to a stirred solution of 1-hydroxy-2-(1'-sulphonaphth-2'-ylazo)-8-(4",6"-dichloro-s-triazin-2"-ylamino)naphthalene-3,6-disulphonic acid (21.28 g, M.I. 1064). After stirring at pH 6 and 20° C. for 1 hour, the temperature was maintained at 35° C. for 28 hours. Any insoluble material was filtered off, the filtrate concentrated to 100 ml and the bluish-red dye precipitated by adding ethanol with stirring.

Yield 20.4 g, M.I. 2065.

EXAMPLE 29

A solution of m-aminobenzylamine (1.525 g) in acetone (20 ml) was added to a stirred solution of 3-acetylamino-4-(3',6',8'-trisulphonaphth-2'-ylazo)-N-(4",6"-dichloro-s-triazin-2"-yl)aniline (28.62 g, M.I. 1145) at pH 6.5 and 20° C. After 30 minutes, the pH was raised to 8.5 and the temperature to 35° C. After a further 5 hours, the reaction was essentially complete, as judged by h.p.l.c., and was screened. Ethanol (170 ml) was added to the stirred filtrate (500 ml) and the resulting precipitated golden-yellow dye collected.

Yield 17.0 g, M.I. 2572.

EXAMPLE 30

A solution of N-methyl-m-aminobenzylamine (1.36 g) in acetone (20 ml) was added to a stirred solution of 3-acetylamino-4-(3',6',8'-trisulphonaphth-2'-ylazo)-N-(4",6"-dichloro-s-triazin-2"-yl)aniline (22.9 g, M.I.11451. The mixture was stirred for 1 hour at pH 6.5 at 25° C., then 1 hour at pH 8.5. The yellow product was precipitated with ethanol.

Yield 16.8 g, M.I. 2438.

Further dyes of Formula 1, by the intersection of a dyestuff compound of formula DNRH, cyanuric chloride and a diamine of Formula 3, are shown in the following Table 3.

TABLE 3

| DNRH | Linking Diamine | Shade |
| --- | --- | --- |
| 1-Amino-4-(3'-amino-4'-sulpho-anilino)anthraquinone-2-sulphonic acid | m-amino benzylamine | Bright blue |
| Copper complex of 8-amino-1-hydroxy-2-(2'-hydroxy-5'-sulphophenylazo)naphthalene-3,6-disulphonic acid | N-isopropyl-m-amino benzylamine | Violet |
| The 1:2-chromium complex of 8-amino-1-hydroxy-2-(4'-nitro-2'-hydroxyphenylazo)naphthalene-3,6-disulphonic acid | m-amino benzylamine | Black |
| Copper complex of N-(2-hydroxy-5-sulpho-3-aminophenyl)-N'-(2'-carboxy-4'-sulphophenyl)-ms-formazan | m-amino benzylamine | Blue |
| Copper complex of N-(2-hydroxy-4-sulpho-3-aminophenyl)-N'-(2'-carboxy-4'-sulphophenyl)-ms-formazan | N-hydroxyethyl-m-amino benzylamine | Blue |
| Copper complex of N-(2-hydroxy-5-amino-3-sulphophenyl)-N'-(2'-carboxy-4'-sulphophenyl)-ms-formazan | N-methyl-m-amino benzylamine | Blue |

I claim:

1. A process for coloring textile materials which comprises applying thereto a water-soluble reactive dye of the formula:

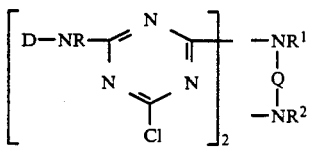

wherein D represents a chromophore selected from the group consisting of azo, anthraquinone and triphendioxazine, each of which has one or more sulphonic acid groups; each of R, $R^1$ and $R^2$, independently, represents hydrogen or a $C_{1-8}$-alkyl which is unsubstituted or substituted by a substituent selected from the group consisting of halogen, hydroxy, cyano, carboxy, carbamoyl or phenyl and Q represents a group of the formula:

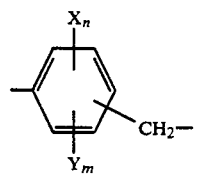

wherein each of X and Y, independently, represents halogen, alkoxy, nitro, carboxy or sulpho and each of n and m, independently, represents an integer from 0 to 2.

2. A process for coloring textile materials according to claim 1 wherein D is the radical of the azo, anthraquinone, phthalocyanine, formazan or triphenodioxazine series carrying one or more sulphonic acid groups.

3. A process for coloring textile materials according to claim 2 wherein D is a sulphonated monoazo group.

4. A process for coloring textile materials according to claim 3 wherein D is a group of the formula:

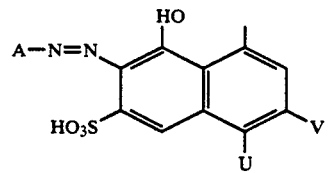

wherein A is a sulphonated phenyl or naphthyl group and one of U and V is $SO_3H$ and the other is H.

5. A process for coloring textile materials according to claim 3 wherein D is a group of the formula:

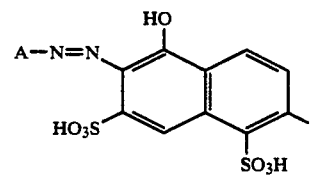

wherein A is a sulphonated phenyl or naphthyl group.

6. A process for coloring textile materials according to claim 4 wherein A is a sulphonated phenyl or sulphonated naphthyl group.

7. A process for coloring textile materials according to claim 6 wherein the sulpho group in A is in an ortho position relative to the azo link.

8. A process for coloring textile materials according to claim 7 wherein A is a group of the formula:

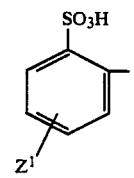

wherein $Z^1$ represents H, $SO_3H$, $C_{1-4}$-alkyl or $C_{1-4}$-alkoxy.

9. A process for coloring textile materials according to claim 7 wherein A is a group of the formula:

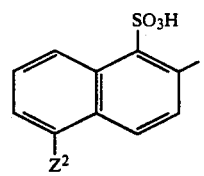

wherein $Z^2$ represents H or $SO_3H$.

10. A process for coloring textile materials according to claim 3 wherein D is a group of the formula:

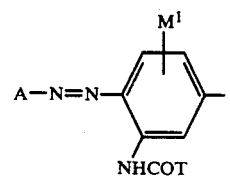

wherein A is a sulphonated naphthyl group, $M^1$ is hydrogen or $C_{1-4}$-alkoxy and T is $C_{1-4}$-alkyl or $-NH_2$.

11. A process for coloring textile materials which comprises applying thereto a water-soluble reactive dye which, in the free acid form, is of the formula:

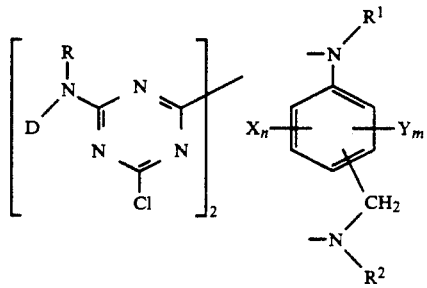

wherein each of R, R¹ and R² independently is H or $C_{1-4}$-alkyl;

each X and Y independently is halogen, nitro, carboxy or sulpho;

each of n and m independently represents an integer from 0 to 2; D is selected from the group consisting of;

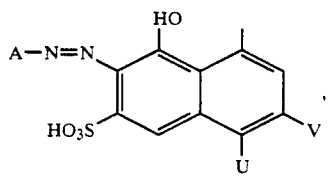

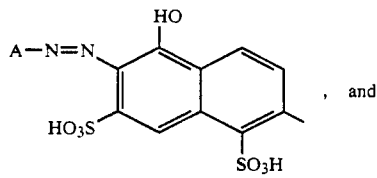, and

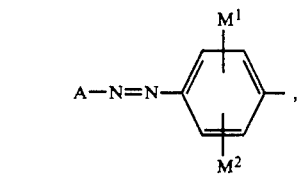

wherein one of U and V is SO₃H and the other is H; and

A is a sulphonated naphthyl group;

M¹ is H, $C_{1-4}$-alkyl or $C_{1-4}$-alkoxy;

M² is H, $C_{1-4}$-alkyl or $C_{1-4}$-alkoxy or —NHCOT, where T is $C_{1-4}$-alkyl or —NH₂.

12. A process for coloring textile materials which comprises applying thereto a water-soluble reactive dye of the formula:

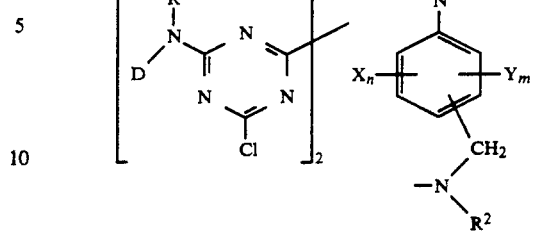

wherein D is a sulphonated azonaphthalene or sulphonated phenylazonaphthalene radical, R is H or $C_{1-4}$-alkyl, each of R¹ and R², independently, is H or $C_{1-4}$-alkyl or hydroxy-$C_{1-4}$-alkyl, each of X and Y, independently, is halogen or sulpho and each of n and m, independently, represents an integer from 0 to 2.

13. A process for coloring textile materials according to claim 12 wherein D, in the free acid form, is selected from the group consisting of

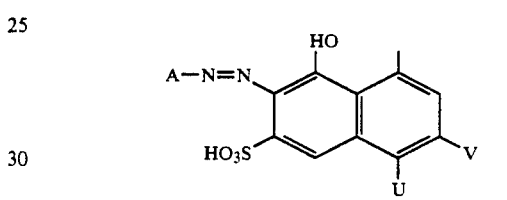

and

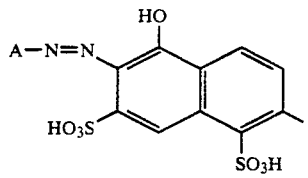

wherein A is a sulphonated phenyl or sulphonated naphthyl radical and one of U and V is SO₃H and the other is H.

14. A process for coloring textile materials according to claim 13 wherein A is selected from the group consisting of

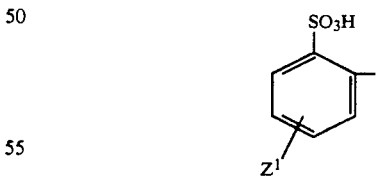

and

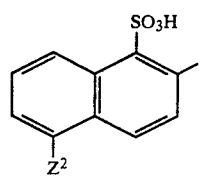

wherein Z' is H, SO₃H, $C_{1-4}$-alkyl or $C_{1-4}$-alkoxy and Z² is H or SO₃H.

15. A process for coloring textile materials which comprises applying thereto a water-soluble reactive dye which, in the free acid form, is of the formula:

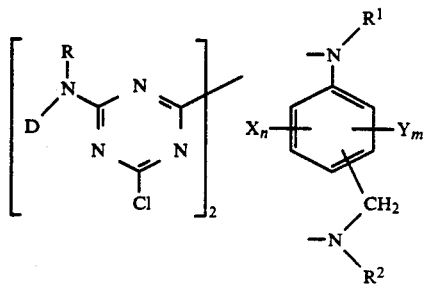

wherein each of R, R$^1$ and R$^2$ independently is H or C$_{1-4}$-alkyl;

each X and Y independently is halogen, nitro, carboxy or sulpho;

each of n and m independently represents an integer from 0 to 2; D is selected from the group consisting of:

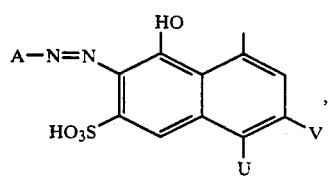

and

-continued

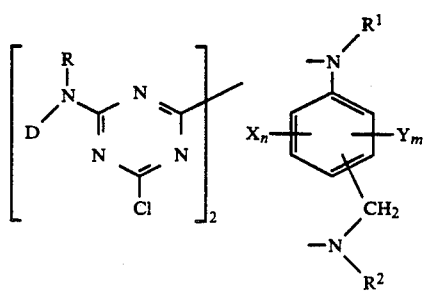

wherein A is 1,5-disulphonaphth-2-yl.

16. A process for coloring textile materials which comprises applying thereto a water-soluble reactive dye which, in the free acid form, is of the formula:

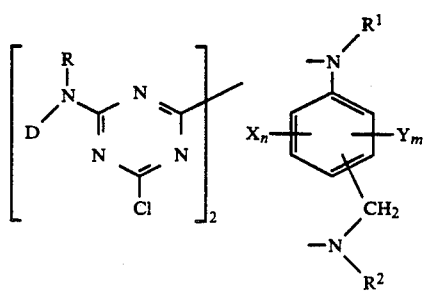

wherein
each of R, R$^1$ and R$^2$ independently is H or alkyl;
each X and Y independently is halogen, nitro, carboxy or sulpho;
each of n and m independently represents an integer from 0 to 2; D is

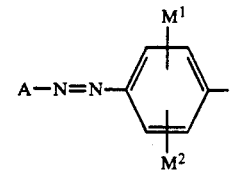

wherein
M$^1$ is H, C$_{1-4}$-alkyl or C$_{1-4}$-alkoxy;
M$^2$ is H, C$_{1-4}$-alkyl or C$_{1-4}$-alkoxy or —NHCOT;
T is C$_{1-4}$-alkyl or —NH$_2$;
A is 3,6,8-trisulphonapth-2-yl, 1,5-disulphonaphth-2-yl or 1,5,7-trisulphonaphth-2-yl.

* * * * *